Dec. 25, 1928.
H. PRIEST
1,696,325
BEARING FOR LAWN MOWERS AND THE LIKE
Filed May 20, 1926
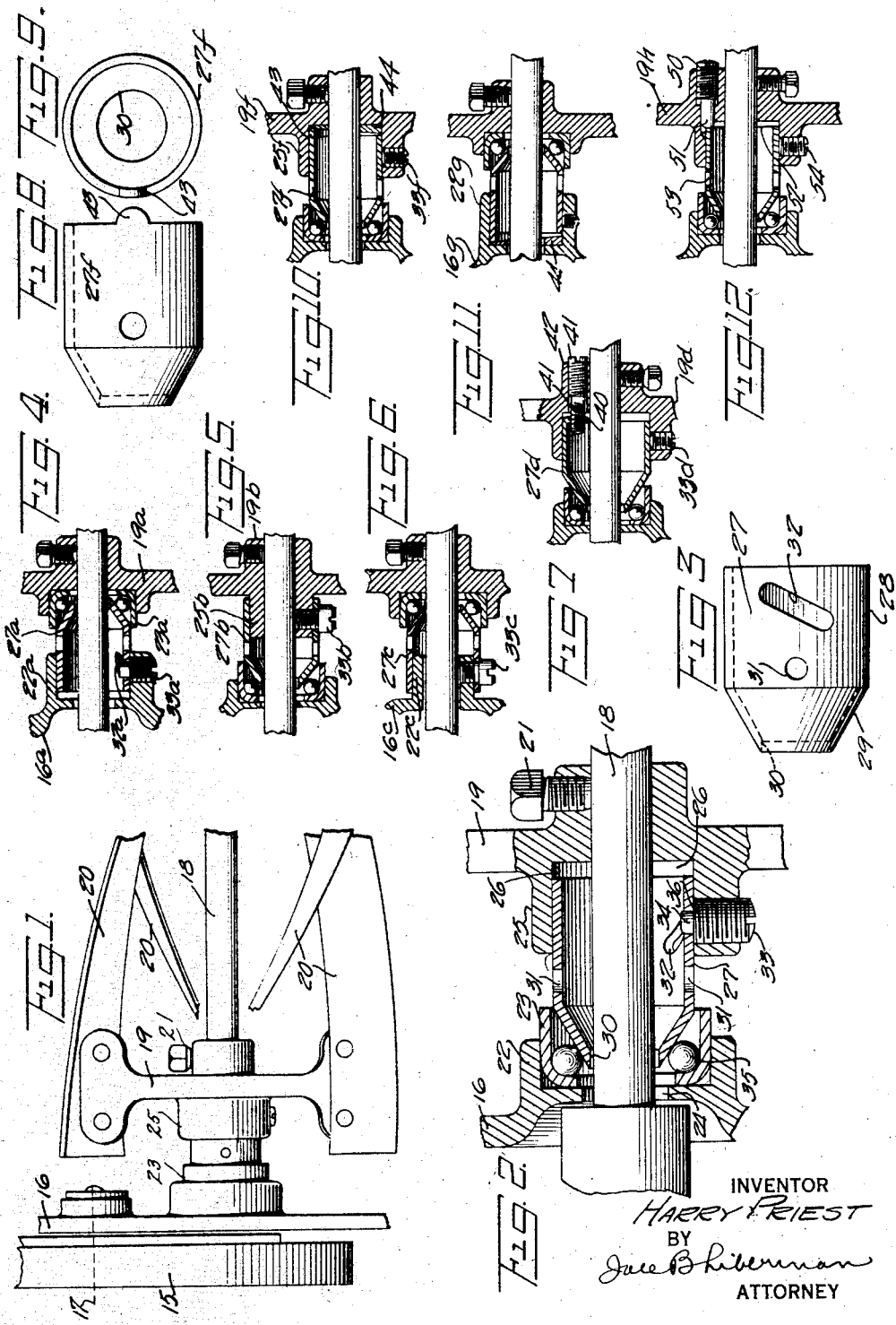
INVENTOR
HARRY PRIEST
BY
Jule B Lieberman
ATTORNEY Patented Dec. 25, 1928.

1,696,325

UNITED STATES PATENT OFFICE.

HARRY PRIEST, OF POUGHKEEPSIE, NEW YORK.

BEARING FOR LAWN MOWERS AND THE LIKE.

Application filed May 20, 1926. Serial No. 110,353.

The present invention relates to bearings for lawn mowers and the like, and is more particularly directed toward an adjustable ball bearing having a drawn-metal cone-shaped ball-race.

In order to insure satisfactory operation of lawn mowers, it is desirable that the cylinder carrying the spiral shaped cutting knives run on the shaft with a minimum of friction and with an entire absence of looseness of parts. It is particularly desirable that the bearings for this rotatable cylinder hold the cylinder in accurate adjustment relative to the stationary shear plate. The present invention is more particularly designed to provide an improved bearing suitable for holding the cylinders of lawn mowers.

The present invention contemplates an improved bearing for this purpose which may be readily adjusted to eliminate looseness of parts and which will remain securely in adjustment for long periods of time, one that is unlikely to get out of adjustment for long periods under the shock and rough usage given a lawn mower.

A further object of the invention is to provide a bearing having a drawn metal cone so as to effectively carry the thrust as well as the weight of the rotating parts.

Other and further objects of the invention will be apparent as the description proceeds.

In the accompanying drawings, there is shown for purposes of illustrating the invention several of the many possible embodiments in which it may take form, it being understood that the drawings are illustrative of the invention rather than limiting the same.

In these drawings:

Figure 1 is a fragmentary elevational view of one end of a lawn mower provided with a form of bearing made according to the present invention;

Figure 2 is an enlarged sectional view, showing the adjacent parts of the lawn mower and an adjustable bearing having an oblique slot for facilitating adjustment;

Figure 3 is a detailed view of the cone shaped bearing member showing an adjustable form of cone;

Figures 4 to 6, inclusive, are views similar to Figure 2 but on a reduced scale, showing modified forms of bearing using an oblique adjusting slot;

Figure 7 is a similar sectional view illustrating a form of bearing utilizing a right and left hand screw for adjusting the cone;

Figures 8 and 9 are side views and end views respectively, of a modified form of adjustable cone having an end projection;

Figures 10 and 11 are sectional views illustrating bearings utilizing an adjustable cone of the type shown in Figures 8 and 9; and Figure 12 is a sectional view illustrating a further modification.

As indicated in Figure 1, one of the lawn mower wheels is shown at 15. It is mounted in a stationary casting 16 to rotate about an axis indicated by the dotted line 17 in the usual manner. The wheel is coupled by the usual ratchet and clutch mechanism to a shaft 18 which carries the end flanges 19 on which are mounted the cylinder knives 20. Only one of these flanges is shown. They are locked to the shaft 18 by screws 21.

According to the form of the invention illustrated in Figure 2, the casing 16 has a boss 22 to receive the ball race 23, the shaft 18 passing out through a hole 24 in the casing 17 and through the center of the ball race 23. The flange 19 is provided with a boss 25, recessed as indicated at 26 to receive the adjustable cone of the bearing.

The cone 27, as shown in Figure 3, has a cylindrical portion 28 and a conical end portion 29. These cones are preferably made out of heavy gauge cold rolled steel and stamped into shape. The central hole 30 is then punched into the end of the stamping. The cylindrical portion of the adjustable cone is preferably pierced in a number of places, as indicated at 31, and is also provided with an oblique slot 32. These adjustable cones are ground accurately to size and case hardened so as to be wear resistant.

The cylindrical part 28 of the cone is slipped into the recess 26 in the boss 25, and a locking screw, provided with a reduced end portion 34, is adapted to fit into the slot 32 in the adjustable cone. Balls 35 are placed between the cone shaped ball race and the stationary ball race 23. The other end of the lawn mower may be constructed in the same manner as the parts just described, or, if desired, a non-adjustable cone or other form of bearing may be used.

To effect adjustment of the lawn mower cylinder, it is merely necessary to unloosen the locking screw 33 sufficiently to permit the movement of the cone carrying bearing member relative to the cylinder flange 29. A wrench, nail or other implement may be inserted into the hole 31 and the bearing member turned slightly, thereby causing the cone to move along the axis of the shaft 18 and effecting an adjustment of the bearing. After the parts have been tightened, it is preferable to move the adjustable cone slightly backward to prevent binding of the bearing and excess friction.

One may then tighten the locking screw 33, and as the inner face 36 of this screw engages the outer surface of the hollow bearing member, one secures an exceedingly tight joint between the cylinder flange and the cone. This is on account of the slight tendency to distort the cylindrical end of the cone member.

In the form of bearing shown in Figure 4, the adjusting cone $27^a$ is mounted in the boss $22^a$ carried by the stationary casting $16^a$, and the locking screw $33^a$ engages in an oblique slot $32^a$ in this adjustable cone. The ball race $23^a$ is carried in the flange $19^a$.

In the form of construction illustrated in Figure 5, the adjustable cone $27^b$ is carried outside a boss $25^b$ on the cylinder flange $19^b$ and a locking screw $33^b$ passes through an oblique slot (not shown) in the adjustable cone $27^b$.

In the form of construction illustrated in Figure 6, the adjustable cone $27^c$ is carried on the outside of a boss $22^c$ carried by the casting $16^c$ and a locking screw $33^c$ passes through an oblique slot (not shown) in the adjustable cone $27^c$.

In all of the forms of construction shown in Figures 1 to 6, inclusive, one unloosens the locking screw 33, $33^a$, $33^b$, or $33^c$, adjusts the cone in the manner indicated with respect to Figure 2, and then tightens the locking screw to clamp the parts in place.

In the form of construction illustrated in Figure 7, the adjustable cone $27^d$ is provided with an inwardly bent ear 40 threaded to receive an adjusting screw 41. This adjusting screw is threaded through the hub 42 of the cylinder end flange $19^d$. This flange also carries a locking screw $33^d$. To adjust this form of bearing, the locking screw $33^d$ is loosened and the adjusting screw 41 turned to effect the adjustment, this screw carrying both right and left threads.

In Figures 8 and 9, a modified form of adjusting cone $27^b$ is shown. It is of the same general shape as the cone shown in Figure 3, but instead of having the oblique slot 32, it is provided with a rearwardly extending projection 43.

Figure 10 illustrates the use of an adjusting cone, such as shown in Figures 8 and 9, in a bearing similar to that shown in Figure 2. Here the adjusting cone $27^f$ is inserted into the boss $25^f$. To effect an adjustment, the locking screw $33^f$ is loosened and the cone turned on its axis as before, the projection 43 riding along the inclined surface of the tapered washer 44, thereby moving the adjusting cone along the axis of the shaft.

Figure 11 shows a construction similar to Figure 10. In this case, however, the tapered washer 44 is carried in the boss $22^g$ carried by the end casting $16^g$ and the adjusting cone is carried in this casting instead of in the cylinder flange.

In the form of the invention illustrated in Figure 12, a screw 50 is threaded into the hub of the cylinder flange $19^h$, the end 51 of this screw being engageable with the end 52 of the adjusting cone 53. The screw 15 may be used to adjust the cone along the axis of the shaft and the cone locked in place by the locking screw 54 as before.

It is obvious that the invention may be embodied in many forms and constructions, and I wish it to be understood that the particular forms shown are but several of the many forms. Various modifications and changes being possible, I do not limit myself in any way with respect thereto.

What is claimed is:

In a lawn mower, the combination with a stationary frame, a knife carrying cylinder including end flanges and a shaft on which the end flanges are mounted, of a bearing for supporting the cylinder and shaft from the frame, said bearing comprising a ball race carried by the frame, and means for releasably clamping the cone race to an end flange, said means including a locking screw which passes through an oblique slot in the cone race whereby the cone race may be adjusted by turning the cone race about the flange when the screw is loosened, the screw having a shoulder to engage with the outside of the cone race to clamp it in the flange.

Signed at Poughkeepsie, in the county of Dutchess, and State of New York, this 17th day of May, 1926.

HARRY PRIEST.